Aug. 25, 1942.   M. R. MULLEN   2,293,912
PROPELLER
Filed Sept. 9, 1941
FIG_1_
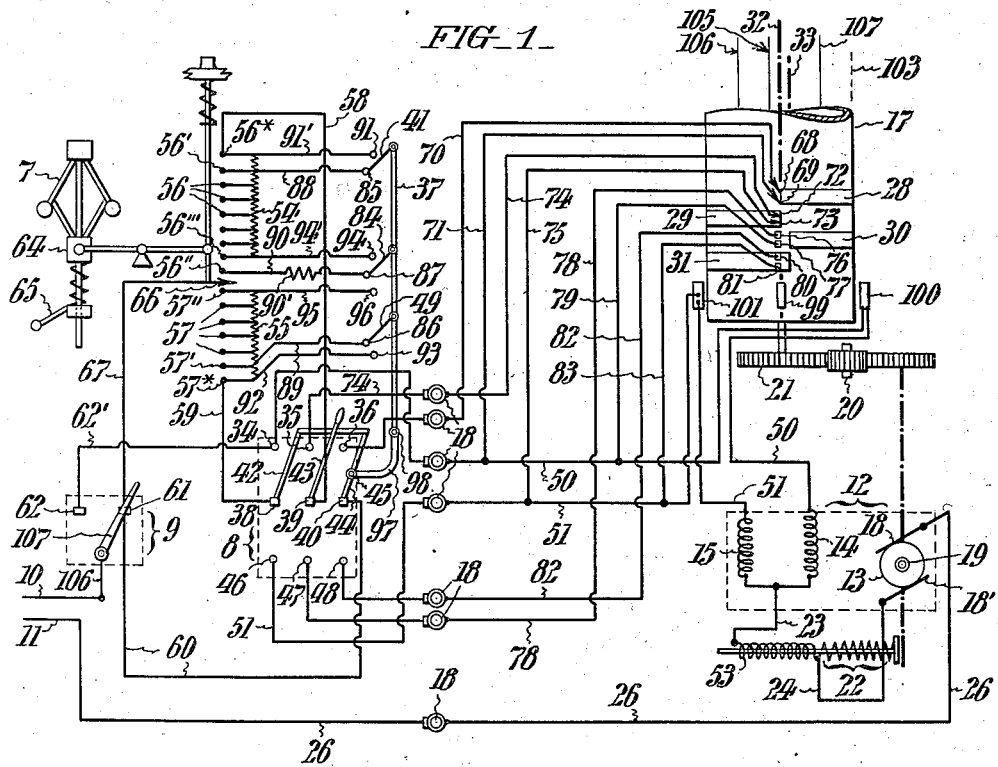
FIG_2_
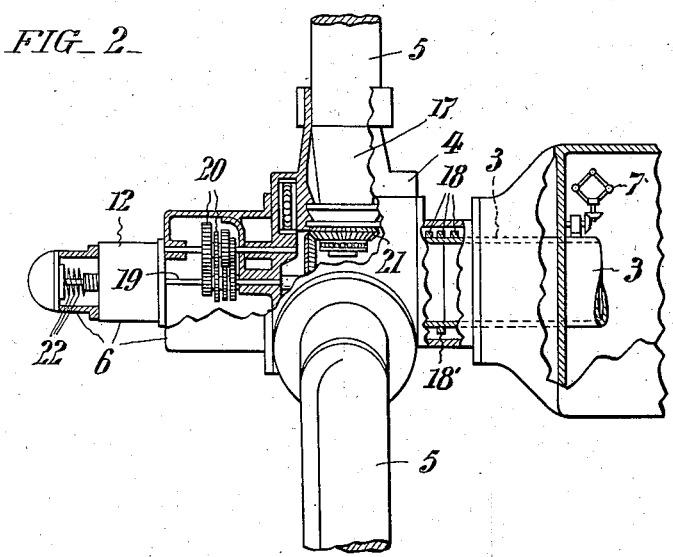
WITNESSES:
Hubert Fuchs
Woodrow Stevenson
INVENTOR:
Milton R. Mullen,
BY Paul & Paul
ATTORNEYS.

Patented Aug. 25, 1942

2,293,912

UNITED STATES PATENT OFFICE 2,293,912

PROPELLER

Milton R. Mullen, Philadelphia, Pa.

Application September 9, 1941, Serial No. 410,125

8 Claims. (Cl. 170—163)

This invention relates to propellers and, more particularly to the type employed on aircraft, the pitch whereof is controlled in accordance with conditions of flight.

Specifically, the present invention has reference to a controllable pitch propeller assembly of the species disclosed in U. S. A. Patent No. 2,228,776, granted to the present applicant under date of January 14, 1941; and the primary aim now had in view is certain improvements in the patented disclosure effective to include with the constant speed negative pitch, the minimum positive pitch and the minimum negative pitch, means whereby the respective advantages of fixed negative pitch and of automatically variable negative pitch may be combined, so as to have a minimum negative pitch of other than "zero," and an automatically variable pitch beyond that minimum.

Another object is the provision of means effective to lower the propeller speed of operation in negative pitch so as to reduce the inherent disadvantage resultant to driving the air away from the cooling surfaces.

A further object is to enable shifting of the normal zero operating position to a relatively higher speed position.

The foregoing definitions are indicative, in general terms, of the main aims of this invention, while the detailed advantages of the disclosure herein will be best appreciated after an understanding of the following description considered in conjunction with the accompanying sheet of drawings; while the concluding claims more concisely express the features of novelty over the prior art.

In the drawing:

Fig. 1 is a diagrammatic view showing the electrical circuit connections for controlling an aircraft propeller in accordance with the instant improvements; and, Fig. 2 is a fragmentary and part sectional view of a propeller controlled by the means of Fig. 1.

Referring more in detail to the drawing which is substantially similar to those of Patent No. 2,228,776, hereinbefore referred to, the propeller shaft is designated by the reference numeral 3, while 4 indicates the hub and 5 the blades. The blades 5 are arranged, in conformity with known practice, for simultaneous rotation to shift the position of their respective leading edges for changing the pitch of the propeller. The control assembly includes a stationary portion mounted on the aeroplane adjacent the shaft 3, while other portions are movable with the hub 4 and in part located in a housing 6 secured to said hub. A governor 7 is driven by the shaft 3, while a main switch 8 and a feathering control switch 9, also mounted on a fixed portion of the aeroplane, are included in the hook-up assembly to power leads 10, 11.

The pitch adjusting and controlling motor 12, Fig. 2, has an armature 13 with oppositely wound field coils 14, 15, for rotation of said motor in the desired direction, and at least one control sleeve 17 operable with the propeller blades 5; while 18, 18' designate the brush commutators. The shaft 19 of the motor 12 is coordinated by gears 20 to a gear 21, at the inner ends of each blade 5, and whereby they are all simultaneously moved; while a spring-loaded magnetic brake 22 holds the armature 13 at rest, when the field coils 14, 15 are de-energized. The armature 13 is served with electric energy, in series with the coils 14, 15, from a power lead 10 by a conductor 23 and branch 24 to one brush 18' of said armature, and from power lead 11 by a conductor 26 to the other brush 18.

The control sleeve 17 includes insulated conducting strips 28, 29, 30 and 31; while the heavy dot-and-dash line 32 typically indicates the zero position o. leading edge of the blade 5, with which said sleeve is associated. Particular attention is directed, at this juncture, to the fact that, in accordance with the instant improvements, the adjoining terminal portions of the conducting strips 30, 31 are displaced to the right-hand, negatively of zero, in Fig. 1, with respect to the corresponding ends of the strips 28, 29, for resultant provision of a negative governor shunting range between zero and minimum automatic variable pitch, as conventionally indicated by the short heavy dot-and-dash line 33 in said figure; while the strips 30, 31 are preferably adjustable, in a circumferential direction, for a purpose hereinafter set forth.

The main control switch 8 is, preferably, of the three-pole double-throw type; that is to say, it includes three forward contact elements 34, 35 and 36; three intermediate contacts 38, 39 and 40 to which the blades 42, 43 and 44 of said switch are respectively fulcrumed. The blade 44 has an intermediate pivot 45 for a purpose later on explained, while the switch 8 is also provided with three contacts 46, 47 and 48, for negative pitch operation.

The forward contact elements 34, 47 of the switch 8 are connected to the field winding 14 by a conductor 50, and the reverse contacts 35, 46 to the field winding 15 by a conductor 51, for effecting positive and negative pitch respectively; whereas said field windings are connected together and to the coil 53 of the magnetic brake 22, by a lead 23, and a conductor 24 to the armature brush 18', armature 13 and brush 18 to the conductor 26. Two spaced variable resistances 54, 55, respectively, each having a plurality of taps 56, 57 are utilized, the former 54 being connected at the outer end by a lead 58 to the intermediate contact element 39 of the main switch 8; whereas the latter 55 is similarly connected by a lead 59 to the intermediate contact 38, of said switch. A lead 60 connects the contact 61 of the feathering-switch 9 with the intermediate contact 40 of the main switch 8; while said feathering-switch also includes another contact 62 for ensuring, under certain conditions, a full feathering position for the propeller blades 5, by way of a lead 62', in accordance with the patent before mentioned.

The conventional governor 7 includes a movable member 64, which changes its position in accordance with the speed above or below a selected level under control of adjuster means 65 in known manner; while said governor, for any particular setting, enables placement of a movable contact 66, having a lead 67, in connection with the feathering switch contact 61; whereby said movable contact is shiftable into engagement with one of the taps 56''' or 56 of the resistance 54, or one of the taps 57, 57', 57'' or 57* of the resistance 55, in accordance with the operation of the governor 7, in an obvious manner.

It is to be here remarked that two of the conducting strips 28, 29 may each embrace an arc up to approximately eighty-five or ninety degrees, and extend in opposite directions from the line 32, which indicates the leading edge of the propeller blades 5; whereas the proportionally similar strips 30, 31 are correspondingly directed with respect to the negative line 33, while there is a suitable gap between strips 30, 31 to prevent "hunting." The contact strip 28 has two associated elements 68, 69 for contact therewith, the former 68 being connected by a lead 70 to the main switch contact element 36, and the latter 69 through a lead 71 to the conductor 50. The contact strip 29 has two similar elements 72, 73 for contact therewith under certain conditions, the former 72 being electrically connected by a lead 74 to the main switch contact element 35, and the latter 73 through a lead 75 to the conductor 51. Similarly the conducting strip 30 has elements 76, 77 for contact therewith under certain conditions, with leads 78, 79 respectively connected to the main switch forward contact 47 and the conductor 50; while the conducting strip 31 has corresponding elements 80, 81, also for contact therewith under certain conditions, with leads 82, 83, the former 82 connecting to the main switch reverse element 48, and the latter 83 with the conductor 51.

In order that the zero position of the respective resistances 54, 55 may be varied, use is preferably made of the shunt means now to be described, said means preferably comprising an actuator member 37 with operatively coordinated switch elements 41, 49 and 84, in turn pivoted to contact members 85, 86 and 87, with leads 88, 89 and 90, said leads being respectively in conductive connection as follows: 88 with an inner tap 56' of the variable resistance 54; 89 with an inner tap 57' of the variable resistance 55; 90 with the center contact 56''; while the outer tap 56*, of the variable resistance 54, has a lead 91' to a contact 91 positioned for coaction with the switch element 41; whereas the outer tap 57* of the resistance 55 has a lead 92 to a contact 93 for engagement by the switch element 49; and, somewhat correspondingly, the lead 90, which includes a resistance 90' connects with the tap 56'' connectable with either resistance 54 or 55. An inner tap 56''' of the resistance 54 is joined by a lead 94' to a contact 94 for engagement by the switch element 84; whereas a like lead 95 intervenes the innermost tap 57'', of the resistance 55, and a contact 96 also within the limits of movement permitted the switch element 84, in order to effect moving the "zero" point to higher and lower speed positions, respectively, without varying the values of the resistances 54, 55. It is highly desirable to operate the engine at a lower speed during reverse or negative pitch because the propellers 5, when so operating, drive the entrained air away from the normal cooling surfaces of the engine, and it is therefore desirable to limit the engine power output to approximately fifty percent of that allowable for positive operation. The actuator member 37 is, accordingly, slidably mounted in any appropriate manner, not shown, for reciprocation by means of a crank 97 pivotally attached thereto at 98 and in turn swiveled to the fulcrum 45 of the switch blade 44. Thus it will be apparent that when the main switch 8 is moved over to "positive" pitch position the actuator 37 will be shifted to effect conductive engagement of the switch elements 41 and 84 with the associated high speed contacts 91, 94; and, vice versa, when said switch is moved over to "negative" pitch position the actuator 37 correspondingly effects engagement of the switch elements 84, 49 with the associated contacts 96, 93.

The control sleeve 17 is, preferably, provided with a projection 99, while a cut-out mechanism 100 operates for breaking the circuit upon contact therewith of the projection 99, said mechanism being conveniently interposed in the conductor 50 leading to the field winding 14; whereas another cut-out mechanism 101, interposed in the conductor 51 leading to the field winding 15, breaks the circuit, upon engagement by the projection 99.

The mode of operation of the control means hereinbefore described will be readily appreciated by those conversant with the art, or upon reference to the within mentioned prior Patent No. 2,228,776. It is desired, however, to stress the fact that when it is desirable to maintain the proper pitch of the propeller for constant speed operation of the engine driving said propeller, the feathering switch 9 is set with the lever arm 107 in engagement with the contact 61, as shown, and the governor 7 is adjusted for the required speed; whereas the main switch 8 is set with the blades 42, 43 and 44, in engagement with the positive pitch contact elements 34, 35 and 36, or with the negative pitch contact elements 46, 47 and 48; whereupon certain control circuits are thereby closed. All of these circuits are completed only during desired periods by the switch 8 and, in some instances, by parts of the control sleeve 17. For example, when the leading edge of the propeller blade 5 is in the negative quadrant and normal forward operation is desired, current is fed from the switch 8 independent of the governor 7 and dependent only upon the blade leading edge position 32 so that, regardless of engine speed, the blade 5 is immediately swung about its axis to the positive quadrant, the circuit for such movement being completed through the contact strip 28, contact members 68, 69, leads 70, 71, conductor 50, field winding 14 only when the blade leading edge is in the negative quadrant and the switch 8 in forward position. As the leading edge of the blade 5 passes zero and goes into the forward quadrant, contact strip 28 ceases to engage the contact member 68, 69 and the governor shunting circuit, to the forward field 14, is interrupted.

Similarly, when the switch 8 is set for reverse quadrant operation, with the blades 42, 43 and 44 respectively coactive with the negative contact elements 46, 47 and 48, the forward field 14 may receive current only while the leading edge of the blade 5, as indicated by control sleeve 17, is in the negative quadrant and the contact strip 30 is completing a circuit through contact members 76, 77. Thus any circuits that would cause movement of the governor-controlled forward moving circuits is interrupted at the end toward zero of contact strip 30 at or before (not later than) zero pitch when the switch 8 is set for negative quadrant operation.

It is to be noted that contact strip 31 can complete the governor shunting reverse field 15 circuit only when the blade leading edge is forward of the minimum negative constant speed pitch and the switch 8 is set for negative quadrant operation, in which case current is supplied directly to the reverse field 15. Similarly the leading edge of the blade 5 is prevented from entering the negative quadrant during positive quadrant operation, as the circuit between the switch 8 and the field 15 can be completed only when the leading edge is forward. This is accomplished by routing the circuit through contacts dependent upon the leading edge position and operated in relation thereto; or, the contact strip 29 completes the reverse field 15 circuit through contact members 72, 73 only when it and the blade leading edge reach or come forward of line 32 which is shown at the position of positive pitch minimum, or zero pitch. Incidentally the fine line 103, Fig. 1, designates the full feathered pitch, whereas the line 33 typically indicates the minimum limits of the conducting strips 30, 31 beyond the zero or negative pitch minimum; while the similar fine lines 105, 106, respectively designate the minimum negative constant speed and the maximum negative speed respectively, with the intervening space the negative constant speed range, the space between the line 32 and line 105 being covered by governor shunting circuits, whereas the line 107 designates the maximum positive constant speed.

Should the blade leading edge be in the negative quadrant when the switch 8 is thrown to positive operating position, there can be no current flow to field 15, as the contact strip 29 is not in position to complete the circuit through contact members 72, 73. There is, however, a circuit completed between the power lead 10 and the forward field 14, both through the governor controlled circuit of switch 8, contact element 34, conductor 50, etc., and through the governor shunting circuit of said switch, contact element 36, lead 70, contact member 68, contact strip 28, contact member 69, lead 71, conductor 50, through circuit interrupter 100, conductor 50, forward field 14, etc., until the blade leading edge reaches zero, whereupon contact strip 28 no longer is in position to contact the members 68, 69, nor to thereby complete the governor shunting circuit.

Energy is supplied to the armature 13 of the pitch adjusting and controlling motor 12, in series with the field coils 14 and 15, through the branch conductor 23, magnetic brake coil 53, branch 24, motor armature 13, and the conductor 26 to the power lead 11.

When in positive pitch on energization of the field 15 there is a rotation of the motor armature 13 which is transmitted by the gearing 20, 21 to the respective blades 5 to shift the latter in such manner that their leading edges are brought closer to a vertical plane extending through their longitudinal axes. On the other hand, if the load on the propeller is reduced so that the engine driving the propeller shaft 3 tends to speed up, the increase is indicated by the governor 7, which moves the contact member 66 into engagement with one of the taps 57 of the resistance 55, and a circuit is set up by way of the power lead 10, conductor 106, switch arm 107, lead 67, movable contact 66, resistance 55, lead 59, switch blade 42, conductor 50, field 14, armature 13, and conductor 26 to power lead 11; whereby provision is made for automatic pitch change in accordance with the load change on the propeller.

In order that the automatically variable negative pitch may be changed, attention is directed to the fact that the terminal points 76, 77 and 80, 81 of the respective conducting strips 30, 31 are arcually shifted to the right-hand of the line 32 in Fig. 1, or the desired minimum automatically variable negative pitch position, as indicated by the line 33 in said figure: the purpose being to combine the advantages of fixed negative pitch and automatically variable negative pitch. Immediately upon shifting the switch 8 for negative pitch operation, the negative governor shunting circuit through contact strip 31 and reverse field 15 carries the blades 5 to the minimum negative constant speed pitch. There the pitch will remain until an increased throttle setting causes a further increase of negative pitch through resistance 55, etc., conductor 51, and reverse field 15. A decreased throttle setting then following will decrease the negative pitch through the governor controlled circuit resistance 54, conductor 58, contact 47, lead 78, point 76, strip 30, point 77, lead 79, conductor 50, and forward field 14 until contact strip 30 moves away from contact with the points 76, 77, thus interrupting the forward pitch movement and leaving a negative pitch value of 10°, plus or minus; that is to say the leading edge of blades 5 will be 10° negative pitch at line 105.

Now it will be apparent that when the switch 8 is thrown for operation of the propeller in the negative quadrant, or for coaction of the switch blades 42, 43 and 44, with the contact elements 46, 47 and 48, the actuator 37 will be correspondingly drawn with consequential engagement between the switch elements 49, 84 and the associated contacts 93, 96, respectively. As a result a governor shunt circuit is completed between the tap 57' of the variable resistance 55, lead 89, contact 86, switch element 49, contact 93, lead 92, to the outermost tap 57* of the variable resistance 55 whereby provision is made for a minimum automatically variable negative pitch, inasmuch as the governor shunting circuit carries the propeller blades 45 to the minimum automatically variable negative pitch, at line 105. On the other hand the conducting strip 30, by its displacement as aforesaid, interrupts, at slightly beyond the minimum automatically variable negative pitch, the governor controlled forward operating circuit including the lead 94' from the tap 56''' of the resistance 54, contact 94, switch elements 84, contact 87, and resistance lead 90 to the contact 56'', and thereby prevents further forward movement past that point while the switch 8 is set for negative pitch operation. Furthermore, it is to be borne in mind that by provision of the actuator 37 and operatively coordinated switch elements 49, 41 and 84 with the associated contacts 86—93, 91—85, 87—96 or 94, a definite means is provided for lowering the speed of operation in negative pitch relative to that in positive pitch. In other words, the effective position of the resistances 54, 55 is variable by the actuator 37, in the event that physical movement of said resistances is impracticable.

For any further understanding of the advantages of this invention, reference should be had to the within mentioned prior patent; and while one specific means has been herein disclosed whereby movement of the main switch 8 to positive pitch position shifts or varies the resistances 54, 55 so as to have the effect of changing the minimum negative automatically variable pitch position to a higher speed position, it is to be understood the same is capable of other forms of embodiment without departing from the spirit of the invention, and the scope of the following claims.

Having thus described my invention, I claim:

1. In a controllable pitch propeller assembly of the type described, the combination of a governor of adjustable setting respective to the speed of the propeller; a motor; a contact connected to a source of electrical energy movable by the governor; two spaced variable resistances adjacent said governor, one of which is connected with said contact on movement of the governor from its neutral position; switch means operable at the will of the operator to determine whether the pitch change is to be to, and in, the negative or positive pitch range; a control means including circuit making and breaking means movable by the propeller blades during change of pitch which shunt the governor actuated contact for effecting movement of said blades into the proper range of pitch as determined by the position of the operator controlled switch means aforesaid; an auxiliary switch coordinated to the operator controlled switch means; and electrical means under control of the resistance shifting switches effective, on movement of the operator controlled switch means to negative pitch position, to change the constant speed operation beyond minimum negative pitch.

2. The combination of claim 1, wherein certain of the circuit making and breaking means, operable with the propeller blades, are circumferentially pre-set relative to the leading edge of the respective propeller blades to provide a range independent of the governor, and the associated terminal contact members are in electrical connection with the forward and reverse contact elements of the operator controlled switch means.

3. The combination of claim 1, wherein one of the control sleeve circuit making and breaking means is in the form of spaced arcual conductive strips having the adjoining ends confidentially pre-set relative to the leading edge of the respective propeller blades to provide a range independent of the governor, and the associated terminal contact members are in electrical connection with the forward and reverse contact elements of the operator controlled switch means.

4. The combination of claim 1, wherein the auxiliary switch comprises an actuator movably coordinated to the operator controlled switch, switch elements being pivoted to said actuator and to stationary contacts, relatively spaced outer rigid contacts, and electrical connections from the respective contacts to the outer and innermost taps of the spaced variable resistances to effect shifting of the normal zero position to a lower speed position.

5. In a controllable pitch propeller assembly, of the type described, the combination of means for effecting variations in the pitch of the propeller blades; a pitch changing motor for said propeller; at least one governor controlled power circuit for effecting forward adjustment of the pitch; at least one power circuit independent of the governor for effecting reverse adjustment of the pitch; means operable with the propeller blades for interrupting certain of said circuits at a pitch angle negatively of zero pitch; other means operable with the propeller blades to interrupt certain of said circuits at approximately said zero pitch; and manually operable control means for selectively changing the respective aforementioned circuits to effect positive or negative pitch operation.

6. In a controllable pitch propeller assembly of the type described, the combination of means for effecting variations in the pitch of the propeller blades; a pitch changing motor for said propeller; a governor controlled power circuit for effecting forward adjustment of the pitch; a similarly controlled power circuit for effecting reverse adjustment of the pitch; means operable with the propeller blades to interrupt said circuits at the predetermined minimum of the negative automatically variable pitch range; other means operable with an independently controlled power circuit for effecting reverse adjustment of the pitch; means operable with the blades to interrupt the last mentioned circuit at approximately the predetermined minimum of the negative automatically variable pitch range; and manually operable control means for selectively utilizing certain of the aforesaid circuits and control means to effect forward adjustments of pitch to full-feathering position.

7. In a controllable pitch propeller, the combination of a hub; blades mounted on said hub with means operative to variably adjust the pitch thereof; a governor with means for adjusting its setting; power circuits and control means for effecting automatic positive pitch variations relative to an approximate zero position; means for effecting changes negatively from any point of such pitch range; selective power circuits with associated control means operative to effect negative automatically variable pitch with a minimum of other than the zero position aforesaid; and means independent of the governor, when the leading edge of the propeller blades is in the negative quadrant, to effect normal forward operation of said propeller.

8. In a controllable pitch propeller, the combination of a hub; blades mounted on said hub with means operative to variably adjust the pitch thereof; a governor with means for adjusting its setting in accordance with the position of a manually operable control means; a power circuit and control means independent of the governor to effect full feathering position of the blades;

manually operable means and means operable with the blades combining to effect positive automatically-variable pitch operation in which there is a circuit and means to effect forward pitch change with increase in the speed of the governor aforesaid; a circuit with means to effect forward pitch change independently of the governor while in negative pitch; a circuit and means to effect reverse pitch movement with decrease in governor speed while in positive pitch; manually operable means and means operable with the blades combining to effect negative automatically variable pitch operation with a minimum negative pitch of other than and negatively of zero; said last mentioned manually operable means including a circuit to effect reverse pitch movement independently of the governor, to the above mentioned minimum negative pitch from points forward thereof, a circuit to effect further reverse pitch movement upon increase in the governor speed, and another circuit to effect forward movement to said minimum negative pitch upon decrease in the governor speed.

MILTON R. MULLEN.